United States Patent [19]
Dao et al.

[11] Patent Number: 5,835,077
[45] Date of Patent: *Nov. 10, 1998

[54] COMPUTER CONTROL DEVICE

[75] Inventors: Ricardo E. Dao; Denny E. Morgan, both of San Diego, Calif.

[73] Assignee: Remec, Inc., San Diego, Calif.

[ * ] Notice: The term of this patent shall not extend beyond the expiration date of Pat. No. 5,581,034.

[21] Appl. No.: 616,753

[22] Filed: Mar. 15, 1996

Related U.S. Application Data

[63] Continuation-in-part of Ser. No. 372,760, Jan. 13, 1995, Pat. No. 5,581,034.

[51] Int. Cl.$^6$ ........................................................ G09G 5/08
[52] U.S. Cl. ......................................... 345/157; 73/514.09
[58] Field of Search ...................................... 345/156, 157, 345/158, 160; 73/514.01, 514.03, 514.09, 504.5, 504.06, 504.07

[56] References Cited

U.S. PATENT DOCUMENTS

| | | |
|---|---|---|
| 2,440,189 | 4/1948 | Zworykin . |
| 2,455,394 | 12/1948 | Webber . |
| 3,084,557 | 4/1963 | Von Ahlefeldt . |
| 3,241,374 | 3/1966 | Menkis . |
| 3,500,691 | 3/1970 | Moore . |
| 3,664,196 | 5/1972 | Codina . |
| 3,967,178 | 6/1976 | Morris . |
| 4,232,553 | 11/1980 | Benedetto et al. . |
| 4,522,062 | 6/1985 | Peters . |
| 4,726,227 | 2/1988 | Moffatt et al. . |
| 4,787,051 | 11/1988 | Olson . |
| 4,797,661 | 1/1989 | Wiley . |
| 4,823,461 | 4/1989 | Takahashi et al. . |
| 4,839,838 | 6/1989 | LaBriche et al. . |
| 4,930,349 | 6/1990 | Takahashi et al. . |
| 4,951,507 | 8/1990 | Takahashi et al. . |
| 4,988,981 | 1/1991 | Zimmerman et al. . |
| 5,012,676 | 5/1991 | Takahashi et al. . |
| 5,128,671 | 7/1992 | Thomas, Jr. . |
| 5,138,154 | 8/1992 | Hotelling . |
| 5,181,181 | 1/1993 | Glynn ....................................... 345/163 |
| 5,193,392 | 3/1993 | Besson et al. . |
| 5,210,549 | 5/1993 | Takahashi . |
| 5,235,237 | 8/1993 | Leonhardt . |
| 5,243,861 | 9/1993 | Kloeck et al. . |
| 5,262,777 | 11/1993 | Low et al. . |
| 5,277,064 | 1/1994 | Knigga et al. . |
| 5,279,040 | 1/1994 | Kippelt, et al. . |
| 5,287,119 | 2/1994 | Drumm . |
| 5,303,589 | 4/1994 | Reidmeister et al. . |
| 5,339,095 | 8/1994 | Redford . |
| 5,373,857 | 12/1994 | Travers et al. . |
| 5,553,497 | 9/1996 | Doi et al. . |
| 5,581,034 | 12/1996 | Dao et al. ............................ 73/514.09 |
| 5,631,669 | 5/1997 | Stobbs et al. ............................ 345/163 |

FOREIGN PATENT DOCUMENTS

| 0 664 456 | 7/1995 | European Pat. Off. . |
|---|---|---|
| 674 182 | 9/1995 | European Pat. Off. . |

OTHER PUBLICATIONS

Abstract of Canadian Patent No. 1,245,782, Hand operated cursor control system for computer—has thin rod mounted within box and pivoting when actuated by user's finger to break light beam, Nov. 1988.

*Primary Examiner*—Steven J. Saras
*Assistant Examiner*—Xu-Ming Wu
*Attorney, Agent, or Firm*—Burns, Doane, Swecker Mathis, L.L.P.

[57] ABSTRACT

A computer control device which provides spacial information to a computer or electronic game by sensing the linear acceleration or tilt angle of the control device. The computer control device includes an accelerometer having an enclosure containing a fluid and temperature sensing elements positioned within the enclosure. The fluid moves across the temperature sensing elements in free convection during acceleration or inclination of the enclosure causing a temperature differential between the temperature sensing elements which is measurable. The control device incorporating one or more of these accelerometers senses acceleration or tilt in one to three dimensions and may be used to control a cursor on a computer screen, a display of a virtual reality device, or other computer and electronic game displays.

21 Claims, 5 Drawing Sheets

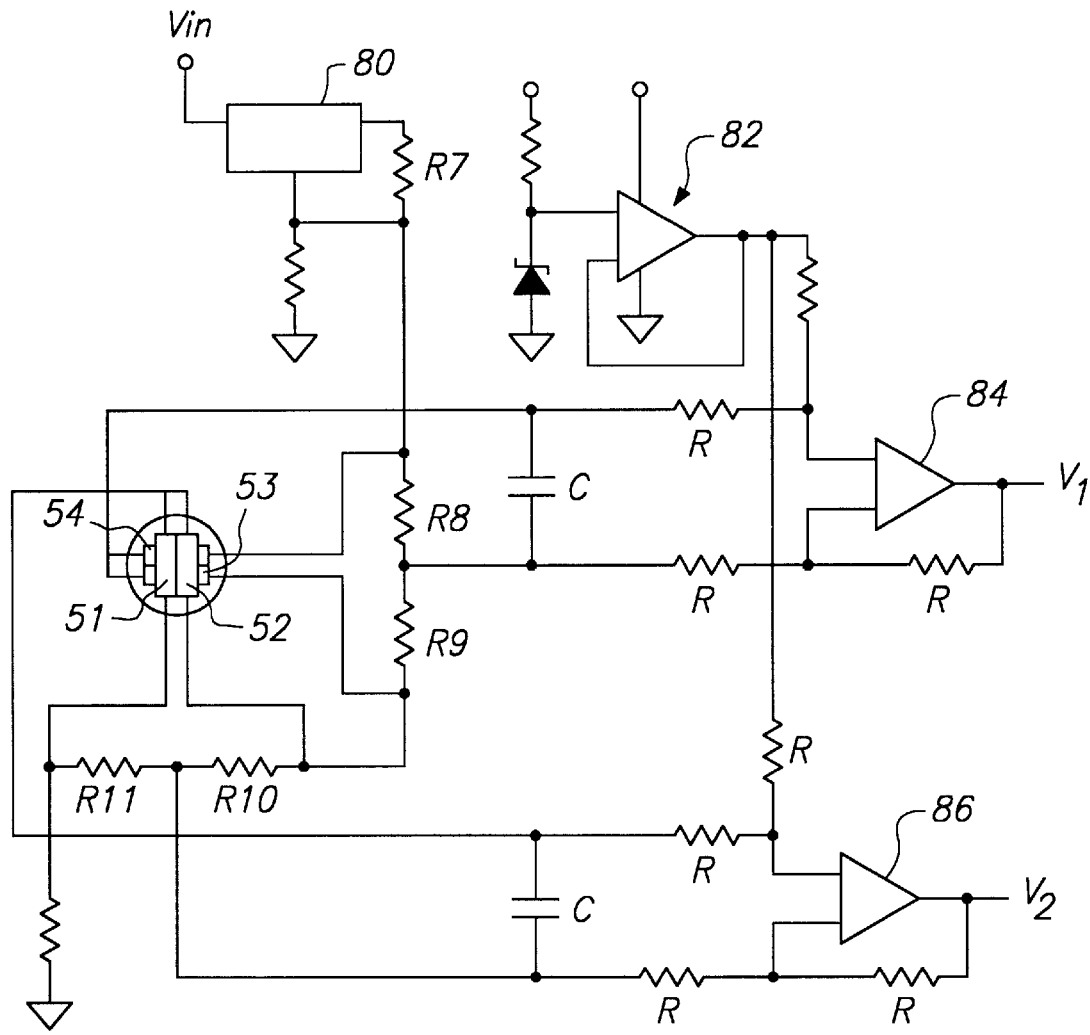
FIG. 7
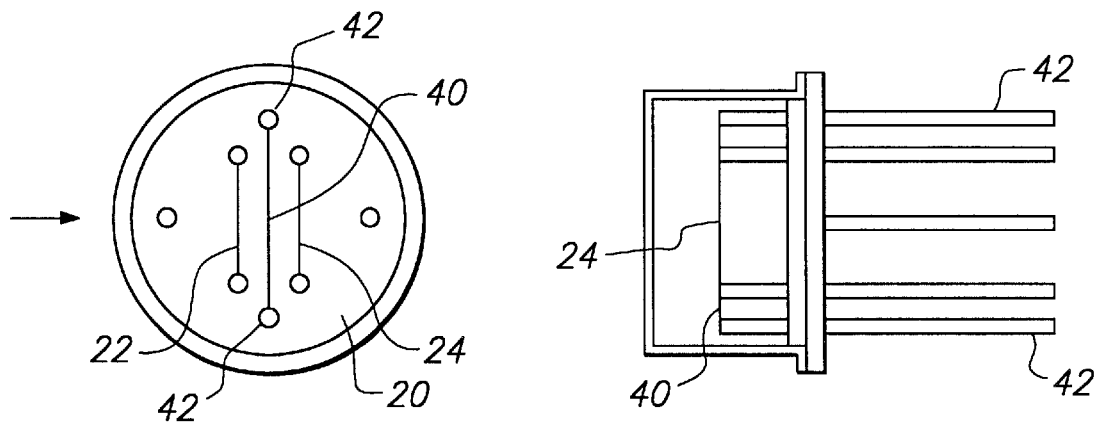
FIG. 8   FIG. 9

COMPUTER CONTROL DEVICE

This is a Continuation-In-Part application of U.S. application Ser. No. 08/372,760, filed on Jan. 13, 1995, now U.S. Pat. No. 5,581,034.

BACKGROUND OF THE INVENTION

1. Field of the Invention

The present invention relates to a computer control device which provides spacial information to a computer or electronic game by sensing the linear acceleration or tilt angle of the control device. The invention also relates to a method of controlling a computer system by inputting directional information to the computer with the control device.

2. Description of the Related Art

In the past, data and information have been inputted into computer systems and electronic games in a variety of ways including keyboards and various types of spacial input devices such as a joystick or a mouse. Data and information have been inputted into games, such as virtual reality games, from tilt or acceleration sensors mounted on headsets, hand held devices, or devices otherwise attached to the user's body. Spacial input devices are generally used to control the position of a cursor which provides an indication of a current location on a computer display, or to report the inclination or tilt angle of a virtual reality device. Manipulation of the cursor may be used to conduct various operations, such as selection of a location to input data or graphics, and selection of modes and functions. In electronic games, the spacial input devices are generally used to indicate the angular position of the user's head, or of a device which may be hand held or attached to an article of clothing such as a glove, boot, or vest.

The most common spacial information input device used with computers for controlling a cursor is the mouse which allows an operator to manipulate the cursor by moving a hand held device on a planar surface. The typical mouse includes a chassis containing a ball with a portion of the ball protruding from an underside of the chassis. When the operator moves the mouse chassis along a flat surface in two dimensions, rotation of the ball is translated into motion of the cursor on the screen in two dimensions. The typical mouse includes moving parts and sensors which may become dirty due to use, and inaccurately measure the rotation of the ball. In addition, the typical mouse requires a relatively large flat surface on which to operate. These devices also require the operator to remove one hand from the keyboard to actuate the device and thus are not conducive to uninterrupted use of the keyboard.

Smaller spacial input devices have been provided by track balls which are generally used with laptop or notebook computers. Although track balls do not require a large flat surface on which to operate, they are still subject to dirt ingress and are more difficult for most users to use accurately than a mouse. These devices also require that one hand leave the keyboard in order to actuate the device. Therefore, it would be beneficial to provide a two dimensional mouse which does not have the drawbacks associated with moving parts, does not require use on a large flat surface, and does not require that the user's hands leave the keyboard.

In electronic games, a typical device for indicating tilt is a liquid filled sensor with an arrangement of four terminals forming a capacitive bridge responsive to tilt angle. When this sensor is mounted on a headset, for example, the tilt angle of the user is translated into an electronic signal which is then converted to degrees of rotation of the user's head. These devices suffer, however, from a restricted angularity range typically less than 70 degrees and have a tendency to "slosh" when moderate angular rates of change are encountered. In addition, the liquid filled device must be mounted so that the liquid level does not exceed the pin heights often necessitating additional mounting means such as daughter-printed circuit boards. The materials and production techniques which are used for these sensors also result in a relatively costly device.

Alternatively, solid state accelerometers may be used for indicating tilt in electronic games which when subjected to a tilt angle will provide an electrical output proportional to that angle which may be readily converted to degrees. These devices suffer a temperature dependance of the zero g or zero degree point which makes them less satisfactory in applications in which temperatures tend to fluctuate. Additionally these solid state accelerometers commonly termed silicon micro machines, are relatively expensive to produce. Biaxial sensors of the silicon micro machine variety are typically twice the cost of single axis versions, since two independent sensor "die" or a single monolithic die which suffers greater attrition in manufacturing is required.

The typical mouse or track ball allows input of positions only in two dimensions. With the increased use of computers for input, manipulation, and control of information in three dimensions, attempts have been made to develop spacial input devices which input information in three dimensions. Some of these three dimensional input devices use beams of light to determine three dimensional position of the input device.

Other three dimensional input devices use acceleration and or angular rate sensors to determine relative position. One such device is the inertial mouse of U.S. Pat. No. 4,787,051 which determines translation from a first accelerometer and determines rotation from the difference in transitional acceleration sensed by the first accelerometer and a second accelerometer. Other spacial input devices which incorporate accelerometers are disclosed in U.S. Pat. Nos. 4,839,838, 5,128,671, and 5,181,181. The accelerometers used in these typical spacial input devices include commercially available accelerometers, such as piezoelectric, piezoresistive, force balanced, or capacitive accelerometers.

Piezoelectric accelerometers include a piezoelectric or crystalline material which generates an EMF in response to acceleration. Piezoelectric accelerometers are used primarily in the measurement of vibration and are generally not capable of measuring constant acceleration. Examples of piezoelectric accelerometers are disclosed in U.S. Pat. Nos. 5,235,237 and 5,193,392.

Piezoresistive accelerometers include mechanical structures which generate strain in critical locations due to acceleration. The acceleration is measured by placing piezoresistors in the locations where strain occurs to generate electric signals corresponding to the acceleration. Piezoresistive accelerometers are capable of measuring constant accelerations at high accelerations, at a moderate cost. However, piezoresistive accelerometers have the disadvantage that they can be used only in a limited temperature range and are sensitive to changes in environmental temperature. Additionally, piezoresistive accelerometers are susceptible to electrostatic discharge and electromagnetic interference due to the high impedance of these devices. Two piezoresistive die or a biaxial die would be required to provide biaxial sensing capabilities which is costly. An example of a piezoresistive accelerometer is disclosed in U.S. Pat. No. 5,277,064.

In a force balanced or servo accelerometer a mass is spring-suspended between two permanent magnets. A displacement of the mass due to acceleration is sensed by a capacitive or other probe. A signal from that probe is amplified and the resulting current passes through a coil wound on the mass, producing a rebalancing force that restores the mass to its original position. Force balanced or servo accelerometers provide high sensitivity and precision, but at a very high cost. Two such devices would be required to provide biaxial sensing capabilities which is costly. An example of a servo accelerometer is disclosed in U.S. Pat. No. 3,664,196.

Capacitive accelerometers include parallel plates which move individually or closer together in response to acceleration. The capacitance between the parallel plates can be measured with electronics. A capacitive accelerometer can be made in a relatively small size. However, as the capacitive accelerometer is made smaller, the size of the electronics required to sense and measure the small output increases. Therefore, the overall size and cost of the capacitive accelerometer is about the same as that of the piezoresistive accelerometers. Additionally they are susceptible to electrostatic discharge and electromagnetic interference due to the high impedance of these devices. Two capacitive die or "beams" or a biaxial die would be required to provide biaxial sensing capabilities which is costly. Examples of capacitive accelerometers are disclosed in U.S. Pat. Nos. 5,303,589 and 5,243,861.

SUMMARY OF THE INVENTION

There is currently a need for a computer, virtual reality, and electronic game control device which provides spacial information in two or three dimensions, is compact, accurate under a variety of conditions, and inexpensive to manufacture.

A control device for inputting information to a computer according to the present invention includes a movable housing including an enclosure containing a fluid, heating means for heating the fluid in the enclosure, and two first temperature sensing elements positioned within the enclosure. The temperature sensing elements are positioned such that the fluid moves across the two first temperature sensing elements in free convection during acceleration or tilting of the enclosure. The first temperature sensing elements providing first output signals which are representative of the respective temperatures of the two first temperature sensing elements. Processing means receive the first output signals and providing an accelerometer signal representative of the acceleration or tilt of the enclosure. Transmission means transmit the accelerometer or tilt signal from the movable housing to a computer or game and which in turn provide control information to control a cursor or provide angularity information to a Virtual Reality or other electronic game.

According to a further aspect of the invention, a method of controlling a cursor includes providing a movable control device, moving the movable control device, sensing acceleration of the movable control device in at least two dimensions by sensing changes in free convention of a fluid within the hand held control device, determining a change in position of the movable control device based on the sensed acceleration or inclination, and controlling an output of the computer system according to the change in position or inclination of the control device.

According to another aspect of the present invention, a method of producing an accelerometer includes steps of mounting a temperature sensing element on a body, placing the temperature sensing element in an oxidizing atmosphere, applying a current to the temperature sensing element in the oxidizing atmosphere to cause oxidation of the temperature sensing element, and precisely controlling the resistance of the temperature sensing element by removing the current when a desired resistance is achieved to produce an accelerometer having a temperature sensing element with a desired resistance.

BRIEF DESCRIPTION OF THE DRAWING FIGURES

The invention will be described in greater detail with reference to the accompanying drawings in which like elements bear like reference numerals, and wherein:

FIG. 7 is a circuit diagram of the signal conditioning electronics for use with the accelerometer of FIG. 5;

FIG. 8 is a top view of a third embodiment of the accelerometer used in the present invention;

FIG. 9 is a side view of the accelerometer of FIG. 8;

DETAILED DESCRIPTION

Figure 1:
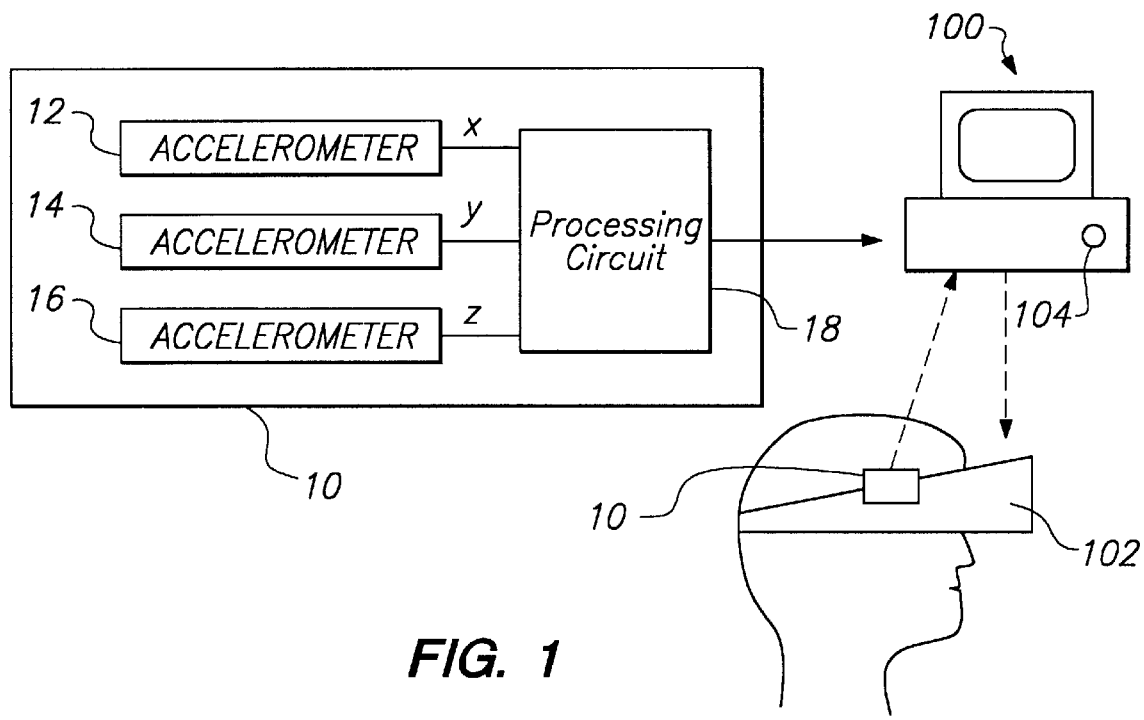
FIG. 1 is a block diagram of the computer control device according to the present invention.

The computer control device 10 according to the present invention, as shown in the flow chart of FIG. 1, includes first, second, and third accelerometers 12, 14, 16 which output temperature signals which are converted into acceleration or inclination information in three different directions by a processing circuit 18. The accelerometers 12, 14, 16 and the processing circuit 18 are positioned within a chassis of the computer control device 10. The chassis may be sized and shaped to fit in the hand of a user. Alternatively, the chassis may be shaped to be attached to a part of the user's body such as the back of the hand or the head of the user.

The accelerometers 12, 14, 16 are positioned within the chassis so that they will sense acceleration or inclination of the chassis in three dimensions. Preferably, the accelerometers 12, 14, 16 are each positioned perpendicular to each other in the X, Y, and Z directions. The output of the accelerometers for each of the X, Y, and Z directions are transmitted to the processing circuit 18 which includes signal conditioning electronics for determining the overall acceleration or inclination of the chassis. The processing circuit 18 in turn provides information regarding the acceleration or inclination of the chassis to a computer, 100. The information provided by the processing circuit 18 may be used in order to manipulate a cursor on the computer screen. Alternatively, the information provided by the processing circuit may be used to control a video display in a virtual reality headset 102, or to control other types of video game displays.

The chassis may also be provided with one or more buttons (not shown) which are used to further control the cursor, such as by selecting an icon or a cursor position. The cursor may also be controlled by voice actuated means by providing a microphone 104 and voice recognition software, which is commercially available for instance using the Sound Blaster 16 Audio card. The voice actuated means allows the control of the cursor in the same manner as the clicking of a mouse button without requiring the user to remove their hands from the keyboard. The cursor may also be further controlled by additional sensors and algorithms used to process additional sensor data to effect what is currently known as clicking the mouse buttons. The chassis may be connected to the computer by either a wireless interface or a wired connection.

Figure 2:
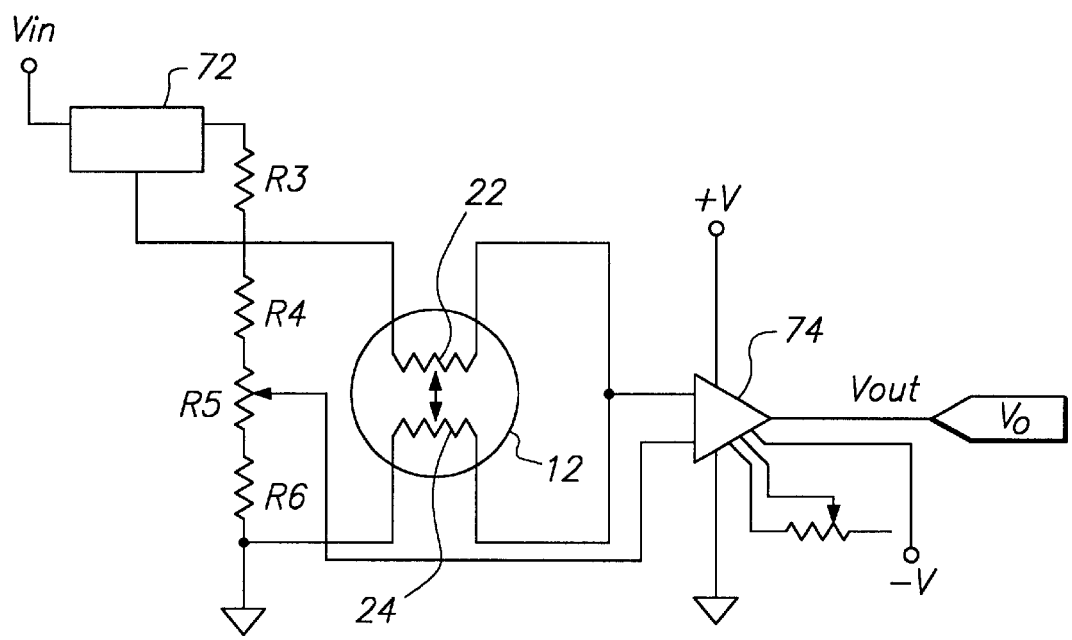
FIG. 2 is a circuit diagram of the signal conditioning electronics used in the computer control device according to the present invention.

The signal conditioning circuit shown in FIG. 2, is an example of the type of circuit which may be used to determine the acceleration or inclination in any one of the X, Y, and Z directions. The processing circuit 18 preferably includes a signal conditioning circuit for each of the accelerometers 12, 14, 16. The operation of the signal conditioning circuit will be described in further detail below. Although the processing circuit 18 including the signal conditioning circuits has been illustrated as positioned within the control device itself, the functions of the processing circuit may also be performed within the computer.

The computer control device 10 has been illustrated in FIG. 1, by way of example, as including three accelerometers 12, 14, 16 which are arranged perpendicular to one another. However, computer control devices using one or two accelerometers may also be used depending on the input information desired.

The preferred embodiments of the accelerometers for use in the control device of the present invention will be described below with reference to FIGS. 3–6, 8 and 9.

Figure 3:
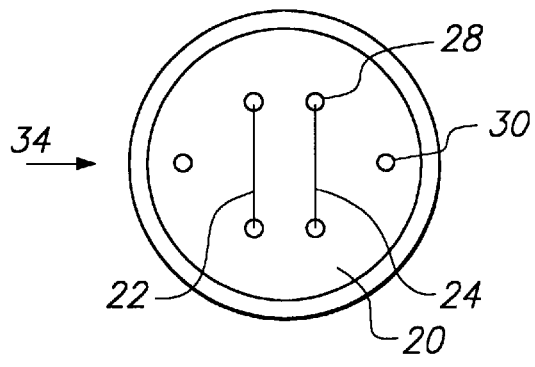
FIG. 3 is top view of an accelerometer used in the computer control device according to the present invention.
Figure 4:
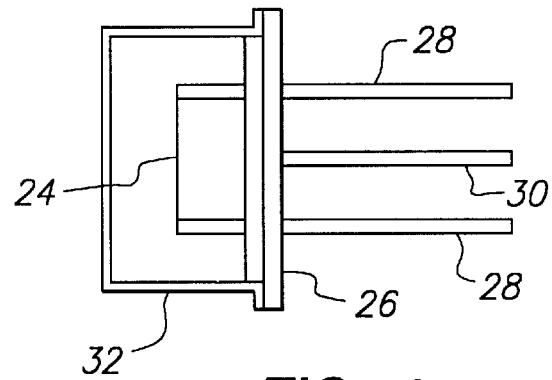
FIG. 4 is a side view of the accelerometer of FIG. 3.

FIGS. 3 and 4 illustrate a first embodiment of an accelerometer for use in the present invention including a hermetically sealed enclosure 20 containing a gas and two temperature sensing elements 22, 24 positioned within the enclosure. In the embodiment shown in FIGS. 3 and 4, the enclosure 10 includes a header assembly 26 which is provided with a plurality of posts 28 extending through the header assembly for use as electrical contacts. As shown in FIG. 3, four of the posts 28 serve as mounting means for the temperature sensing elements 22, 24. Two additional posts 30 are used to provide a ground. The ground posts 30 also provide additional mechanical support for the accelerometer when it is mounted within the control device. The posts 28, 30 are preferably positioned within the header assembly 26 in a symmetrical configuration so that heating of the temperature sensing elements occurs 22, 24 symmetrically.

The enclosure 20 is filled with a fluid and provided with a cover 32, which is configured to engage the header assembly 26 with a tight fit and is hermetically sealed to the header assembly to prevent any of the fluid from escaping. The hermetic seal may be formed by any known technique for forming a leak proof seal including eutectic soldering, projection welding, laser welding, resistance welding or cold welding. The enclosure 20 is preferably formed of metal, such as Kovar. However, other materials such as glass, plastic, ceramic or other glass to metal sealing alloys may also be used. The preferred enclosure 20 is a T08 or T05 can which is available from Schott Glaswerke part numbers SL 08.039 and SL 04.245 respectively. Other suitable parts for the header assembly 26 and the cover 32 of the accelerometer are AIRPAX A08-616-002 and REMEC A500200-330, respectively. Although a separate header assembly 26 and cover 32 are shown in the figures, the enclosure can be formed as a single piece such as a glass bulb containing filaments. Alternatively, a ceramic surface mount package or the electronic packages used in high volume to package crystals for radio frequency applications may be used.

The accelerometer includes a sealed chamber for containing the fluid and for protecting the fluid from outside forces or disturbances so that the fluid is free to move only by natural convection and is not affected by forced convection due to outside sources. The natural convection within the enclosure is altered or changed only by movement of the entire enclosure, thus providing the acceleration sensing.

Free or natural convection is the transfer of heat by the flow of a fluid subject to a heat source. A fluid which is subject to a heat source will flow in a predictable convective flow pattern. This convective flow pattern is affected by acceleration and this effect of acceleration on the convective flow pattern can be measured to determine the acceleration of the enclosure.

When temperature sensing elements 22, 24 of the embodiment of FIGS. 3 and 4 are provided with electric current, the resistances of the elements cause the temperature of the elements to rise. The fluid within the enclosure 20 which is adjacent to the elements 22, 24 is heated by the elements and the fluid rises within the enclosure due to the buoyant forces of heated and thereby lower density fluid. The flow pattern of a fluid in free convection in a stationary system is shown in FIG. 11.

Figure 11:
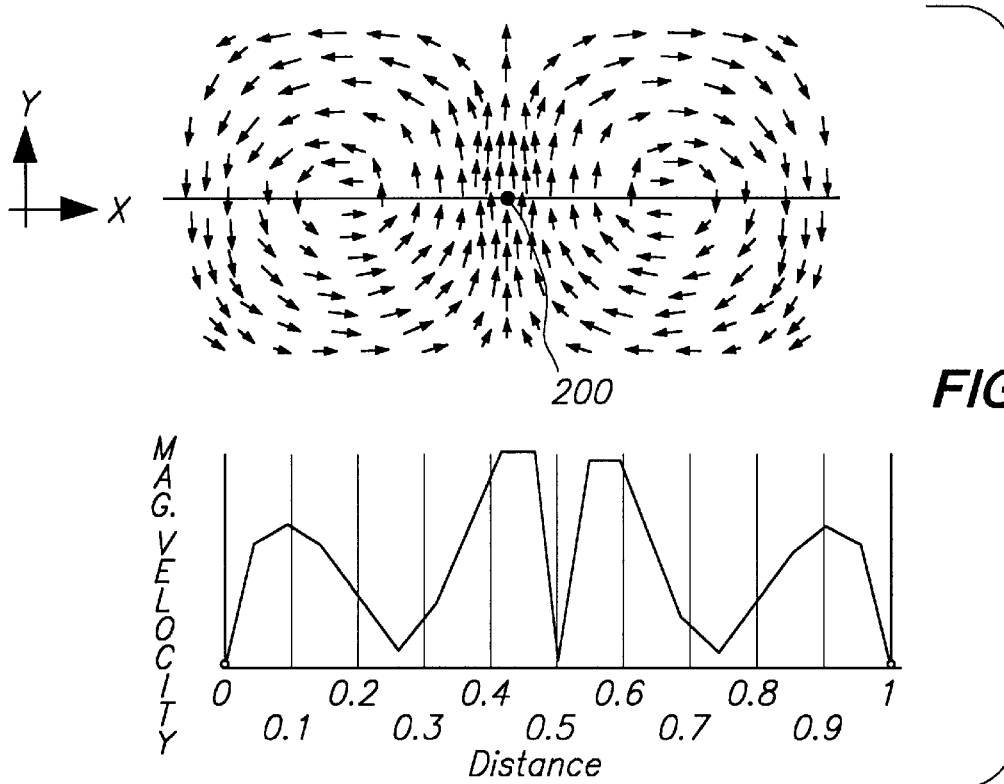
FIG. 11 is a fluid flow model of the fluid flow from buoyant forces in a stationary system.

The source of heat in the model of FIG. 11 is a hot wire 200, such as one of the temperature sensing wires, located in the center of the figure which extends into the paper. In the flow pattern shown in FIG. 11, the fluid heated by the hot wire 200 expands and rises to the top of the enclosure. The cooler and thereby more dense fluid falls to the bottom of the enclosure due to the force of gravity. As can be seen from FIG. 11, the flow pattern of the fluid is symmetrical about a vertical plane through the heat source 200. The lower part of FIG. 11 shows the magnitude of the velocity of the fluid as a function of the normalized distance along the X axis.

The temperature profile of a fluid in free convection in a stationary system is symmetrical about the vertical plane through the heat source. Therefore, temperature sensing elements 22, 24 which are heated equally and positioned symmetrically about a vertical plane through the center of the enclosure 20 will register the same temperature when the accelerometer is not subject to acceleration.

Figure 12:
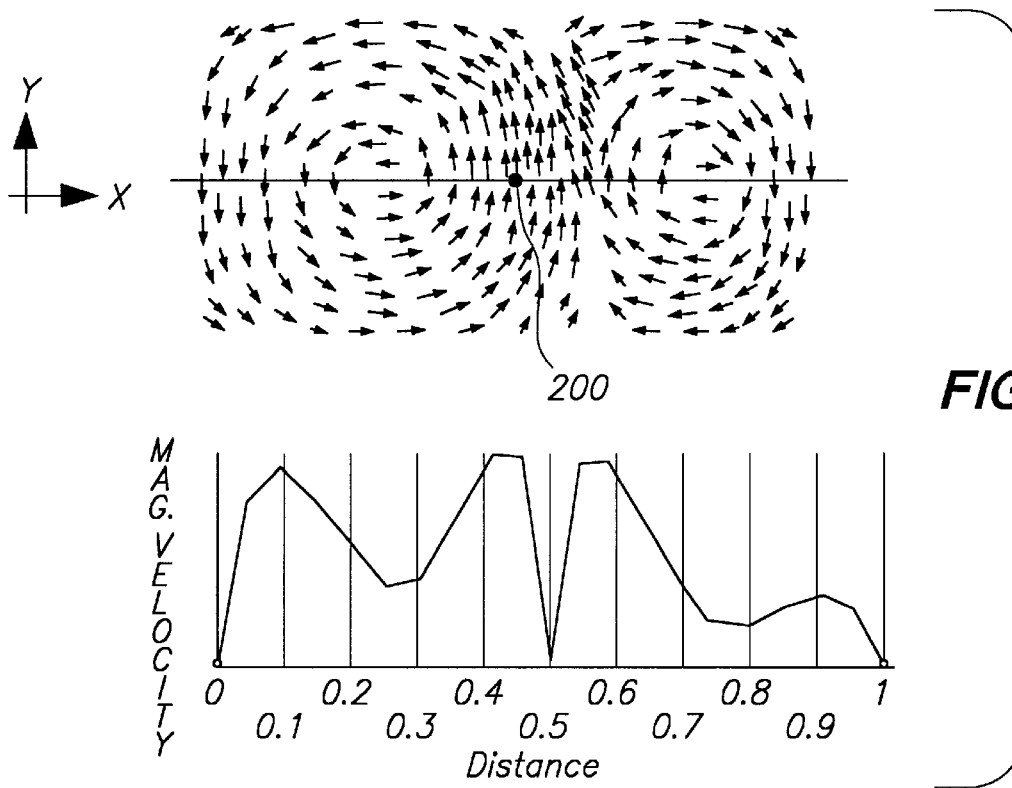
FIG. 12 is a fluid flow model of the fluid flow in a system which is accelerated at 1 g in the X direction.

When the accelerometer is subject to acceleration the convective flow pattern of the gas within the enclosure 20 changes. FIG. 12 shows the convective flow pattern of a fluid which is subject to gravity and to an acceleration of 1 g applied in the X direction (to the right in the figure). The convective flow of the fluid is distorted due to the acceleration so that more of the fluid heated by the central heat source 200 flows to the left in FIG. 12. The lower part of FIG. 12 shows the magnitude of the velocity of the fluid as a function of the normalized distance along the X axis.

When the enclosure 20 is subjected to acceleration, temperature sensing elements 22, 24 which are positioned symmetrically about the vertical plane through the center of the enclosure 20 will be heated differently. The temperature difference between the temperature sensing elements 22, 24 depends on the magnitude of the acceleration. Although the examples shown in FIGS. 11 and 12 include the effects of the force of gravity, it should be understood that the device is sensitive to acceleration even in the absence of gravitational force.

The accelerometer of FIGS. 3 and 4 has an acceleration sensitive axis which is generally perpendicular to and in the same plane as the temperature sensing elements 22, 24. When the accelerometer is accelerated along the acceleration sensitive axis, in the direction of the arrow 34, the convective flow of the fluid within the enclosure 20 is affected as described above with reference to FIG. 12. The pattern of convection is skewed due to the acceleration so that the amount of heat transfer to the first temperature sensing element 22 is increased and the amount of heat transfer to the second temperature sensing element 24 is decreased.

Therefore, when the accelerometer of FIG. 3 is subject to acceleration in the direction of the arrow 34, the temperature of the temperature sensing element 22 will be higher than the temperature of the temperature sensing element 24. This difference in temperature between the first and second temperature sensing elements is used to determine the acceleration along the acceleration sensitive axis. Since changes in temperature cause corresponding changes in electrical resistance, the temperature difference between the sensing elements can be easily measured by an electrical circuit such as a Wheatstone bridge.

The accelerometer can also measure inclinations by measuring the acceleration due to gravity. This inclination measuring function is particularly useful in virtual reality input devices in which the inclination of a body part such as the head, arm, leg, knee, torso, hand, or foot of a user is inputted to a computer for use in a creating a virtual reality display. When the accelerometer of FIGS. 3 and 4 is mounted within a computer control device with the sensing elements 22, 24 horizontal, the inclination angle B of the computer control device can be calculated by the following formula:

$$B \cong \sin^{-1} V_{out}$$

where $V_{out}$ is the output of the accelerometer, B is the angle of inclination about an axis which is parallel to the temperature sensing elements, and the accelerometer output has been electronically calibrated so that 1 volt represents 1 g of acceleration.

When the accelerometer of FIGS. 3 and 4 is mounted within a computer control device with the temperature sensing elements 22, 24 positioned vertical, the inclination angle B can be calculated by the following formula:

$$B \cong \cos^{-1} V_{out}$$

where $V_{out}$ is the output of the accelerometer, B is the angle of inclination about an axis which is parallel to the temperature sensing elements, and the accelerometer output has been electronically calibrated so that 1 volt represents 1 g acceleration.

Accelerations or inclinations in all directions other than 90 degrees to the acceleration sensitive axis will have a component along the acceleration sensitive axis which can be measured by the accelerometer of FIGS. 3 and 4. An acceleration which is applied at 90 degrees to the acceleration sensitive axis will cause an equal change in temperature for each of the two temperature sensing elements 22, 24. Therefore, the difference in temperature between the temperature sensing elements 22, 24 will be zero for acceleration at 90 degrees to the acceleration sensitive axis. In order to sense acceleration in two or three directions in the present invention, more than one accelerometer is provided and positioned perpendicularly.

The temperature sensing elements 22, 24 are preferably positioned near the center of the enclosure 20 at approximately an equal distance from the cover 32 and the header assembly 26 in order to minimize the effects of external temperature changes on the internal temperature of the fluid and the elements. The temperature sensing elements 22, 24 are preferably positioned at a sufficient distance from the walls of the cover 32 so that appreciable heat is not lost to the enclosure before the fluid flow reaches the sensor elements.

Additional containing of the enclosure 20 can also be provided to isolate the fluid and the temperature sensing elements from localized external temperature changes. Temperature isolation may be achieved by providing a second enclosure or casing surrounding the enclosure 20. A fluid such as air provided between the enclosure 20 and the second enclosure or casing would minimize uneven heating or cooling of the enclosure 20. Alternatively, a heat sink may be provided, for example, on the header assembly 26, and the remainder of the enclosure may be insulated. The combination of a heat sink and insulation will effectively isolate the enclosure from the effects of localized external temperature changes.

The temperature sensing elements 22, 24 are preferably of a sufficient length and a small enough diameter so that free convection within the enclosure prevails over conduction of heat through the posts 28, 30. Temperature sensing elements having high aspect ratios (length/diameter) are desirable to assure that heat transfer by convection prevails over heat transfer by conduction of heat through the mounting posts. For example, nickel or tungsten temperature sensing elements of 0.3 inches in length and 0.0003 inches in diameter are acceptable.

The temperature sensing elements 22, 24 are preferably made of a metal having a relatively high temperature coefficient of resistivity because such metals provide higher sensitivity. Linear temperature coefficients of resistivity in the range of −55° C. to 200° C. are desirable for the temperature sensing elements. Suitable metals for the temperature sensing elements include nickel, platinum and tungsten. However, it should be understood that other pure metals and alloys having similar characteristics can also be used.

The temperature sensing elements 22, 24 are shown in FIGS. 3 and 4 as linear wires which are positioned parallel to each other within the enclosure. However, other shapes and variations of the temperature sensing elements are within the scope of the present invention. Particularly, curved or arc shaped sensing elements may better conform the accelerometer output to a linear mathematical function which provides for simplicity of interface. Additionally, coiled temperature sensing elements may be used in place of linear wires.

The frequency response of the accelerometer is affected by the molecular weight of the gas within the enclosure 20. Gases which have higher molecular weights, such as nitrogen, argon, xenon, neon or krypton and mixtures of these are preferred because they provide for greater temperature difference between the temperature sensing elements 22, 24 for the same heat input power. Helium, which has a lower molecular weight than the gases listed above, will increase the frequency response of the accelerometer by an order of magnitude over the frequency response of an accelerometer using nitrogen. However, the low molecular weight of helium will make an accelerometer more sensitive to localized temperature changes in the environment surrounding the exterior of the enclosure and will require more heater power. There is a trade-off between frequency response and sensitivity to localized environmental temperature changes, and there is also a trade-off between frequency response and heater power required. When the computer control device is a hand held device, higher molecular weight gasses are preferred because they are less sensitive to temperature changes due to the user's hand.

The choice of a particular inert gas or mixture of gases will depend on the frequency response and sensitivity required for the control device, and the power available. The use of inert gases is preferred over non-inert gases because non-inert gases may cause the temperature sensing elements to break down or age more quickly.

The frequency response characteristics of the accelerometer output may also be varied by varying the pressure of the gas within the enclosure. When the pressure within the enclosure is varied, the accelerometer will exhibit a different frequency response, however, as has already been described, there will be a trade-off between the frequency response, the sensitivity of the accelerometer to external localized temperature changes and heater input power.

Figure 10:
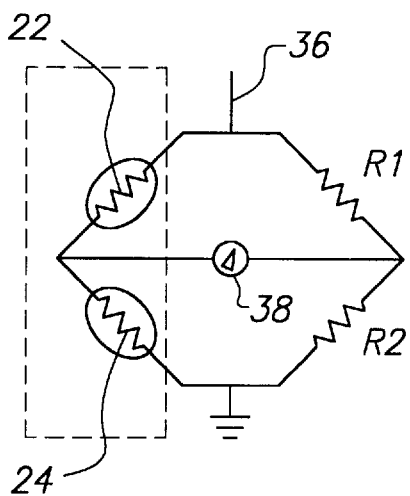
FIG. 10 is a circuit diagram of a resistance determining circuit according to one embodiment of the present invention.

FIG. 10 is an electrical diagram of a basic circuit which may be used to determine the difference in temperature between the two temperature sensing elements 22, 24. The circuit of FIG. 10 determines the difference in the resistances of the two temperature sensing elements by a Wheatstone bridge. The bridge includes a power lead 36, two known resistances R1, R2, and a voltage meter 38 which measures the voltage output. In operation, electrical power is supplied from the power lead 36 through the temperature sensing elements 22, 24 and also through the two known resistors R1, R2. The voltage difference across the Wheatstone bridge from between the two temperature sensing elements 22, 24 to between the two known resistors R1, R2 is measured by the voltage meter 38. The output of the voltage meter 38 depends upon the acceleration of the device. The circuit of FIG. 10 may be positioned either inside the enclosure, inside the chassis but outside the enclosure, or in the computer.

FIG. 2 is circuit diagram of a circuit used for determining acceleration from the accelerometer of FIGS. 3 and 4 which includes signal conditioning. In the circuit of FIG. 2, a constant dc voltage $V_{in}$ is applied to a voltage regulator 72 which provides a constant current source to the temperature sensing elements 22, 24 of the accelerometer 12. The constant current is applied to the first of the temperature sensing elements 22 and is applied through a series of known resistors R3, R4, R5, and R6 to the other of the temperature sensing elements 24. The resistor R5 is a trim pot, the resistance of which may be varied to balance the bridge. Balancing of the bridge is needed when the two temperature sensing elements 22, 24 are not perfectly matched in resistance so that the output is not adversely influenced by any difference in resistance of the sensing elements. The resistances of the resistors R3, R4, R5, and R6 are selected to achieve sensitivity compensation for a particular accelerometer configuration. For the configuration of the accelerometer shown in FIGS. 3 and 4 resistors R3, R4, R5, and R6 having resistances of 60, 100, 50, and 100 ohms, respectively, are acceptable. A voltage between the two temperature sensing wires 22, 24 is compared to the voltage between the two resistances R3 and R5 at the trim pot R4 to determine $V_{out}$ which represents the acceleration or inclination of the accelerometer.

The use of the constant current source provided by the voltage regulator 72 provides self temperature compensation, thus, eliminating the need to provide complicated temperature compensation circuitry. A variable amplifier 74 is provided which allows the output $V_{out}$ to be amplified to a desired amplified output voltage needed for a particular application.

In order to determine acceleration of the control device 10 in two or three dimensions for use in controlling a cursor, two or three accelerometers of the type shown in FIGS. 3 and 4 are mounted within the chassis with their acceleration sensitive axes perpendicular to one another. Alternatively, when the control device is used to control a virtual reality device, one, two, or three accelerometers may be used as inclination sensing devices in a control device which is positioned on the body of the user.

Figure 5:
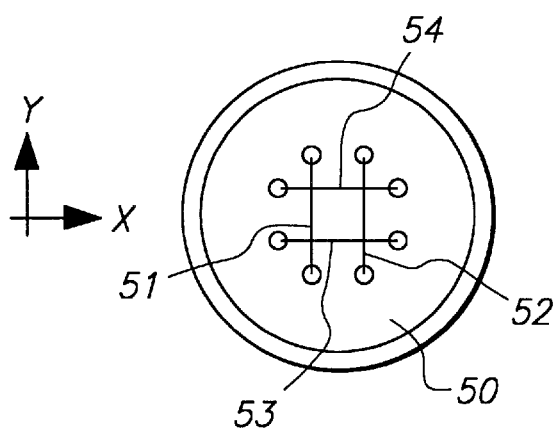
FIG. 5 is a top view of a second embodiment of the accelerometer used in the present invention.
Figure 6:
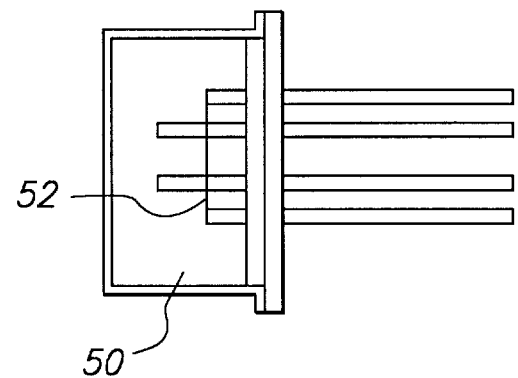
FIG. 6 is a side view of the accelerometer of FIG. 5.

Another embodiment of the accelerometer for use in the control device 10 of the present invention, shown in FIGS. 5 and 6, is configured to sense acceleration or inclination in two dimensions. This embodiment is provided with an enclosure 50 containing four temperature sensing elements 51–54 for sensing acceleration along two acceleration sensitive axes, the X and Y axes. The temperature sensing elements are positioned with two parallel temperature sensing elements 51, 52, and two additional parallel temperature sensing elements 53, 54 which are positioned above and perpendicular to the elements 51, 52. This four wire embodiment may be heated by the temperature sensitive elements themselves or may be provided with a separate heating element positioned centrally within the enclosure 50. This four wire accelerometer of FIGS. 5 and 6 provides the same result as mounting two of the accelerometers shown in FIGS. 3 and 4 at right angles to each other.

A circuit diagram of a circuit for use in determining acceleration in two directions is shown in FIG. 7. This circuit may be used with the accelerometer of FIGS. 5 and 6 which is capable of sensing acceleration in two directions, or may be used with two of the accelerometers of FIGS. 3 and 4. In the circuit of FIG. 7, a voltage regulator 80 provides a constant current source through resistors R7, R8, R9, R10, and R11 to each of the temperature sensing elements 51–54 which are connected in series. The use of the signal conditioning circuit of FIG. 7 conserves power over the use of two of the circuits of FIG. 2 because the temperature sensing elements are connected in series. Additional resistors R and capacitors C connect the temperature sensing elements to comparators 84, 86.

The circuit of FIG. 7 provides comparator outputs $V_1$ and $V_2$ which represent the acceleration or inclination along the two temperature sensitive axes of the biaxial accelerometer. An amplifier 82 is provided which allows a zero point of the outputs to be offset. The zero point is the output voltage achieved for zero acceleration and zero inclination. In some instances it is desirable to offset the zero point from zero, in particular, for applications which are responsive to only a limited range of output voltages. For example, in an application which can receive output voltages of the accelerometer only in the 0 to 5 volt range, negative accelerations could not be sensed by the application. However, if the zero point is offset to 2.5 volts, accelerations in both the positive and negative directions can be sensed.

When the accelerometer of FIGS. 5 and 6 is used as an inclinometer in a computer control device, such as an input device for a virtual reality device the inclinations of the computer control device in two dimensions are determined by the following formulas. When the accelerometer of FIGS. 5 and 6 is mounted with both pairs of temperature sensitive elements horizontal, the inclinations $B_1$ and $B_2$ are:

$$B_1 \cong \sin^{-1} V_1 \text{ and } B_2 \cong \sin^{-1} V_2$$

where $B_1$ is the inclination about an axis parallel to the first pair of temperature sensing elements which produce the output voltage of $V_1$, and $B_2$ is the inclination about an axis parallel to the second pair of temperature sensing elements which produce the output voltage of $V_2$.

When the accelerometer of FIGS. 5 and 6 is mounted with a first pair of temperature sensing elements vertical and a second pair of temperature sensing elements horizontal, the inclinations $B_1$ and $B_2$ are:

$$B_1 \cong \cos^{-1}(V_1/\cos(\sin^{-1} V_2)) \text{ and } B_2 \cong \sin^{-1} V_2$$

where $B_1$ is the inclination about an axis parallel to the first pair of vertical temperature sensing elements which produce the output voltage of $V_1$, and $B_2$ is the inclination about an axis parallel to the second pair of horizontal temperature sensing elements which produce the output voltage of $V_2$. These inclinations may be implemented with polynomials or look up tables depending on the particular microprocessor employed. Although the computer control device has been described as sensing inclinations or accelerations, it should be understood that the computer control device may also use rate of change of inclination or acceleration to control a cursor or virtual reality device.

A third embodiment of the accelerometer for use in the present invention is shown in FIGS. 8 and 9. In this embodiment a heating element 40 is provided between the two temperature sensing elements 22, 24. The heating element 40 is positioned centrally within the enclosure 20 so as to provide even heating of the two temperature sensing elements when the enclosure is stationary.

The heating element 40 is mounted on posts 42 and is preferably formed of the same material as the temperature sensing elements, however, it may also be formed of a different material than the temperature sensing elements 22, 24. For example, the heating element may be formed of a material with a higher resistance than the temperature sensing elements. Metal heating elements similar to those metals used for the temperature sensing elements with relatively high temperature coefficients of resistivity are desirable because they provide a self compensation of scale factor verse temperature.

The heating element 40, as shown in FIGS. 8 and 9 is preferably located symmetrically at an equal distance from both of the temperature sensing elements 22, 24 so that when the accelerometer is not subject to acceleration or inclination heating of the two temperature sensing sensor elements due to convection is equal. An asymmetrically located heating configuration may also be used, however, the output of such an asymmetrically located heated configuration accelerometer will have an offset that changes versus environmental temperature. In addition, the heating of the fluid may be provided by an element other than a wire such as a point source or a coil. Alternatively, two or more heating elements may be used.

The location of the temperature sensing elements 22, 24 with respect to the heating element 40 will affect the frequency response of the accelerometer, i.e., the speed at which the device registers a change in acceleration. Where a higher frequency response is necessary, the temperature sensing elements 22, 24 may be moved closer to the heating element 40 to provide quicker convection of heat from the heating element to the temperature sensing elements. Element spacing, layout, geometry and position are used to control the temperature of the elements, and therefore, the output of the accelerometer. The package size of the accelerometer according to all of the forgoing embodiments can be as small as current miniature electronic component packages, such as, surface mount components.

Alternatively, the temperature sensing elements may be formed using currently standard processes used to make silicon micro-machines such as surface micromachining wherein layers formed on a silicon substrate are preferentially etched to create temperature sensing element structures. Signal conditioning and transmitting means may be combined inside the same package on the same substrate if desired using these techniques.

The output signal $V_{out}$ of any of the above described embodiments of accelerometers may require output signal conditioning to interface with and enhance the performance of the accelerometers. Interface signal conditioning can be used to amplify or diminish the accelerometer output to a voltage required by the particular application electronics. When the accelerometer according to the embodiment of FIGS. 3 and 4, using nitrogen at 1 atm., is accelerated at a rate of about 1 g and is provided with a resistance determining circuit, such as the circuit illustrated in FIG. 10, having an input voltage of about 4 volts at 25° C., the output, $V_{out}$, detected by the voltage meter 38 is about 40 millivolts. Depending on the particular application, an output of 40 millivolts may be insufficient and require amplification by an electronic amplifier or other scale factor circuitry. The 40 millivolt output of the example above described may be amplified to typically between 1 and 10 volts depending on the application.

Signal conditioning may also be used to improve the temperature stability of the accelerometer by compensating for environmental temperature changes. Various temperature compensation circuits are known to those in the art and would be acceptable for compensating for environmental temperature changes in the present invention. An alternate method for reducing the accelerometer sensitivity to external temperature is to employ a constant temperature heater, either external to the accelerometer enclosure 10 or within the accelerometer enclosure itself. The heater keeps the enclosure at a constant temperature and thereby minimizes the effect of environmental temperature changes.

Frequency response compensation circuits may also be used depending on the application, to extend the frequency response of the accelerometer. For example, the frequency response of a nitrogen accelerometer may be extended to the frequency response of a helium accelerometer by a frequency response compensation circuit.

The performance of the accelerometer according to each of the embodiments of the present invention can be improved by matching the resistances in the temperature sensing elements. The temperature sensing elements according to the present invention may have resistances which vary slightly due to differences in the wires themselves or in the mounting of the wires within the enclosure. The temperature sensing elements may be matched by the following procedure which subjects the elements to oxidation to increase the resistances of the temperature sensing elements to a specific desired resistance. The matching of the resistances of the temperature sensing elements improves the performance of the accelerometer and improves consistency between accelerometers which are mass produced.

The signal conditioning, including frequency response enhancement, may be packaged inside in the same package as the sensor and be in the form of an ASIC or other miniaturized semiconductor device.

Figure 14:
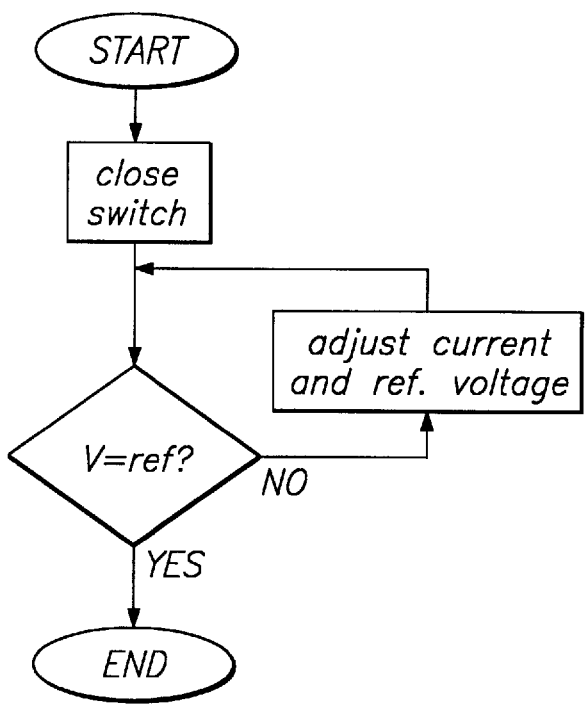
FIG. 14 is a flow chart of the resistance matching process according to the present invention.
Figure 13:
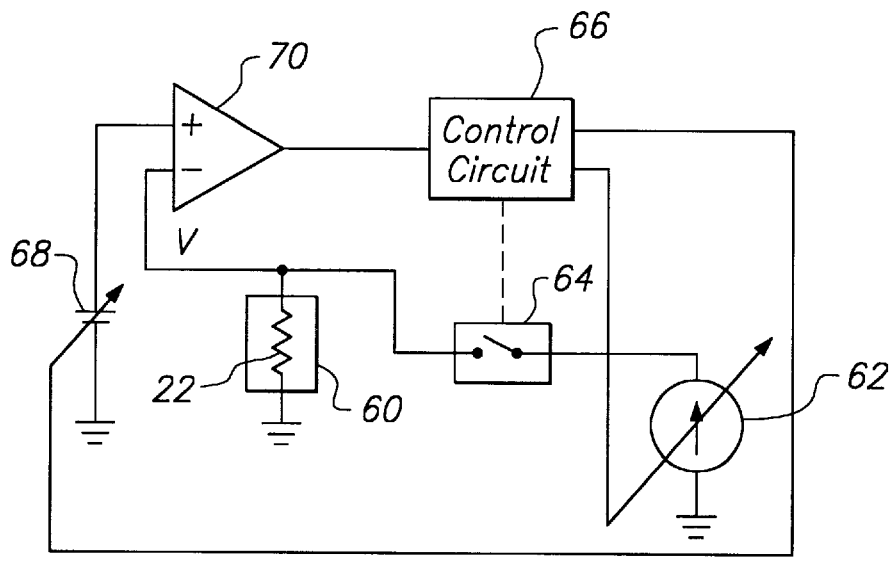
FIG. 13 is a block diagram of a resistance matching circuit according to the present invention.

The temperature sensing elements may be matched using the resistance matching circuit illustrated in FIG. 13 and the resistance matching process of FIG. 14. The temperature sensing elements are preferably matched after they have been mounted on the posts but before the enclosure has been completely enclosed. According to the resistance matching circuit of FIG. 13, the temperature sensing wires 22, 24 are placed in an oxygen rich environment 60 and connected to a current source 62 through a switch 64. The switch 64 and the current source 62 are controlled by a control circuit 66 which may be either analog, digital, or a computer controlled circuit.

When the switch 64 is closed, a current which is sufficient to cause oxidation is applied to a temperature sensing element 22 which is in the oxidizing atmosphere. The oxidation of the temperature sensing element causes the resistance of the element to increase until a predetermined reference voltage is reached. The predetermined reference voltage is set by a reference voltage source 68 according to a signal of the control circuit 66. A comparator 70 is used to determine when the resistance of the temperature sensing element has reached the desired resistance and the control circuit operates the switch 64 to stop the oxidation with great accuracy. If the comparator 70 determines that the element has not reach the desired resistance, the control device 66 may increase the current supplied by the current source 62 until the desired resistance is achieved.

According to another embodiment of the invention, the resistance matching circuit of FIG. 13 includes a variable current source 62 and a variable reference voltage source 68. The accuracy of the resistances achieved by this circuit is increased because the current may be reduced as the resistance of the temperature sensing element 22 approaches the desired resistance. The oxidation of the element 22 is slowed down by the reduction in current and thus, may be more accurately controlled. As the current provided by the current source 62 is reduced, the reference voltage must also be adjusted to compensate for the change in current. Thus, according to the flow chart of FIG. 14, the voltage V from the element 22 is compared to the reference voltage and if the voltage V is less than the reference voltage, the current is reduced and the reference voltage is adjusted. The reduction of the current source as the desire resistance is approached provides a more accurate control of the element resistance.

The resistance of the temperature sensing elements can be achieved with great accuracy using commercially available instruments. The desired resistance is preferably set so that the increase in the resistance of the elements due to oxidation over the pre-oxidation resistance is less than 10%. The process of FIG. 14 can achieve resistances which are accurate to within a range of $10^{-1}$ to $10^{-6}$ ohms, preferably $10^{-2}$ to $10^{-6}$ ohms.

One advantage of matching the resistances of the temperature sensing elements is the elimination of the necessity for bridge balancing, for example by the trim pot in the circuit shown in FIG. 2. Another advantage of the resistance matching process is that the oxidation of the wires provides a metallurgical annealing which relieves stress in the elements and contributes to long term stability of the resistance value.

While the invention has been described in detail with reference to a preferred embodiment thereof, it will be apparent to one skilled in the art that various changes can be made, and equivalents employed without departing from the spirit and scope of the invention.

What is claimed is:

1. A control device for inputting information to a computer comprising:

a movable housing including an enclosure containing a fluid;

heating means for heating the fluid in the enclosure;

two first temperature sensing elements positioned within the enclosure such that the fluid moves across the two first temperature sensing elements in free convection during acceleration or inclination of the enclosure, the first temperature sensing elements providing first output signals which are representative of the respective temperatures of the two first temperature sensing elements;

processing means for receiving the first output signals and providing an accelerometer signal representative of the acceleration or inclination of the enclosure; and transmission means for transmitting the accelerometer signal from the movable housing to a computer.

2. The control device of claim 1, further comprising control means for controlling a cursor on a computer screen in response to the accelerometer signal transmitted to the computer.

3. The control device of claim 2, wherein the movable housing is adapted to be mounted on a part of the user's body, and further comprising a voice activated means for activating the cursor without use of the user's hands.

4. The control device of claim 1, further comprising control means for controlling a virtual reality device in response to the accelerometer signal transmitted to the computer.

5. The control device of claim 4, wherein the movable housing is a device which is attachable to a part of a user's body, and the processing means provides an accelerometer signal representative of the inclination of the part of the user's body for use in controlling the virtual reality device.

6. The control device of claim 5, wherein the device which is attachable to a part of a user's body is a headset.

7. The control device of claim 5, wherein the control means controls a virtual reality display on a display screen.

8. The control device of claim 1, further comprising two second temperature sensing elements positioned perpendicular to the two first temperature sensing elements, the two second temperature sensing elements providing second output signals which are representative of the respective temperatures of the two second temperature sensing elements.

9. The control device of claim 8, wherein the processing means receives the second output signals and provides an accelerometer signal representative of the acceleration or inclination of the enclosure in two dimensions.

10. The control device of claim 1, wherein the heating means is provided by the first and second temperature sensing elements.

11. The control device of claim 1, wherein the heating means is a heating element positioned within the enclosure.

12. The control device of claim 8, wherein the enclosure is a fluid tight chamber and the first and second, temperature sensing elements are positioned within the fluid tight chamber.

13. The control device of claim 12, wherein the enclosure is formed of metal.

14. A method of controlling a computer system comprising:

providing a movable control device including an enclosure containing a fluid, and two first temperature sensing elements positioned within the enclosure such that the fluid moves across the two first temperature sensing elements in free convection during acceleration or inclination of the enclosure, the first temperature sensing elements providing first output signals which are representative of the respective temperatures of the two first temperature sensing elements;

moving the movable control device;

sensing acceleration or inclination of the movable control device in at least one dimension by sensing changes in free convention of the fluid within the enclosure of the movable control device;

determining a change in position or inclination of the movable control device based on the sensed acceleration or inclination; and controlling an output of the computer system according to the change in position or inclination of the control device.

15. The method of controlling a computer system according to claim 14, wherein the step of controlling an output of the computer system includes controlling a cursor on a computer screen according to the change in position or inclination of the control device.

16. The method of controlling a computer system according to claim 15, wherein the cursor is further controlled by activation of voice recognition software.

17. The method of controlling a computer system according to claim 14, wherein the step of controlling an output of the computer system includes controlling a video display of a virtual reality device according to the change in position or inclination of the control device.

18. The method of controlling a computer system according to claim 14, wherein the movable control device is attached to a part of a user's body.

19. The method of controlling a computer system according to claim 14, wherein the enclosure includes two second temperature sensing elements and a change in position or inclination is determined in two dimensions.

20. The method of controlling a computer system according to claim 14, wherein the enclosure is heated by a heating element.

21. The method of controlling a computer system according to claim 14, wherein the enclosure is heated by the first temperature sensing elements.

\* \* \* \* \*